(12) United States Patent
Delgado-Nanez et al.

(10) Patent No.: US 11,955,923 B2
(45) Date of Patent: Apr. 9, 2024

(54) MULTIPLE WALL CONNECTION OVER PIERS

(71) Applicant: Nextracker LLC, Fremont, CA (US)

(72) Inventors: Ricardo Delgado-Nanez, San Jose, CA (US); Jacob Mark Morin, Phoenix, AZ (US); Alexander W. Au, Oakland, CA (US); Samuel Heller, San Carlos, CA (US)

(73) Assignee: NEXTRACKER LLC, Fremont, CA (US)

( * ) Notice: Subject to any disclaimer, the term of this patent is extended or adjusted under 35 U.S.C. 154(b) by 0 days.

(21) Appl. No.: 17/404,640

(22) Filed: Aug. 17, 2021

(65) Prior Publication Data

US 2022/0052637 A1     Feb. 17, 2022

Related U.S. Application Data

(60) Provisional application No. 63/066,653, filed on Aug. 17, 2020.

(51) Int. Cl.
*H02S 20/00*     (2014.01)
*H02S 20/10*     (2014.01)
*H02S 20/32*     (2014.01)

(52) U.S. Cl.
CPC ............ *H02S 20/32* (2014.12); *H02S 20/10* (2014.12)

(58) Field of Classification Search
CPC ...... F16C 17/02; F16C 33/06; F16C 2380/00; F24S 30/425; F24S 2030/15; H02S 20/32; H02S 20/10
USPC ............................................ 136/246; 52/173
See application file for complete search history.

(56) References Cited

U.S. PATENT DOCUMENTS

| | | | | |
|---|---|---|---|---|
| 6,722,357 B2* | 4/2004 | Shingleton | ............... | H02S 20/23 126/600 |
| 8,413,391 B2* | 4/2013 | Seery | ...................... | F24S 25/70 52/173.3 |
| 9,447,991 B2* | 9/2016 | Michotte De Welle | ..................... | F24S 20/70 |
| 10,128,791 B2* | 11/2018 | Ludwig | .................... | F24S 25/37 |
| 11,401,675 B2* | 8/2022 | Karkheck | ............... | E02D 5/801 |
| 2008/0230047 A1* | 9/2008 | Shugar | ..................... | H02S 20/32 126/569 |
| 2008/0308091 A1* | 12/2008 | Corio | ..................... | F24S 30/425 126/606 |
| 2009/0235975 A1 | 9/2009 | Shingleton | | |
| 2009/0260316 A1* | 10/2009 | Jones | ..................... | F24S 30/425 52/745.2 |
| 2010/0139646 A1* | 6/2010 | Barsun | ..................... | H02S 20/10 126/600 |
| 2011/0099923 A1* | 5/2011 | Ventura | ................. | F24S 30/452 136/246 |

(Continued)

OTHER PUBLICATIONS

PCT Search Report and Written Opinion issued in PCT Application No. PCT/US2021/046321 dated Dec. 9, 2021.

*Primary Examiner* — Chi Q Nguyen
(74) *Attorney, Agent, or Firm* — Fredrikson & Byron, P.A.

(57) ABSTRACT

A solar tracker including at least one pair of piers configured to be secured in the ground and defining a span between the pair, a bearing supported on the pier, and a torque tube supported in the bearing such that the bearing enables rotation of the torque tube, the torque tube including a double wall thickness area, wherein the double wall thickness area limits deflection of the torque tube along the span.

8 Claims, 5 Drawing Sheets

(56) References Cited

U.S. PATENT DOCUMENTS

| | | | | |
|---|---|---|---|---|
| 2013/0340807 | A1* | 12/2013 | Gerwing | H02S 20/32 |
| | | | | 136/246 |
| 2014/0338659 | A1* | 11/2014 | Corio | F24S 30/425 |
| | | | | 126/714 |
| 2018/0131312 | A1* | 5/2018 | Sade | H02S 20/32 |
| 2019/0036478 | A1 | 1/2019 | Liu et al. | |
| 2019/0292824 | A1* | 9/2019 | Dally | F16D 1/02 |
| 2019/0372514 | A1* | 12/2019 | Almy | F24S 25/617 |
| 2020/0052643 | A1 | 2/2020 | Ballentine et al. | |
| 2020/0116394 | A1 | 4/2020 | West et al. | |
| 2020/0350853 | A1* | 11/2020 | Schilling | H02S 20/30 |
| 2020/0403561 | A1* | 12/2020 | Corio | F24S 25/12 |
| 2021/0080980 | A1* | 3/2021 | Kesler | H02S 20/32 |
| 2021/0159849 | A1* | 5/2021 | Corio | F16M 11/18 |
| 2021/0234501 | A1* | 7/2021 | Worden | H02S 20/32 |
| 2022/0140775 | A1* | 5/2022 | Almy | H02S 20/32 |
| | | | | 136/246 |
| 2022/0182008 | A1* | 6/2022 | Worden | H02S 20/32 |
| 2022/0182009 | A1* | 6/2022 | Poivet | H02S 20/32 |
| 2023/0030803 | A1* | 2/2023 | LoBue | H02S 30/10 |
| 2023/0070097 | A1* | 3/2023 | Watson | F24S 30/40 |
| 2023/0133308 | A1* | 5/2023 | Ballentine | H02S 20/10 |
| | | | | 136/251 |

\* cited by examiner

MULTIPLE WALL CONNECTION OVER PIERS

BACKGROUND

1. Technical Field

The present disclosure relates to a support structure of a solar power system. More particularly, the present disclosure relates to a system and method for locally increasing the rigidity of a torque tube of a solar tracker proximate a connection point to a pier to reduce deflections of the torque tube and enable decreased size of the torque tube.

2. Discussion of Related Art

Solar power has long been viewed as an important alternative energy source. To this end, substantial efforts and investments have been made to develop and improve upon solar energy collection technology. Of particular interest are industrial and commercial-type applications in which relatively significant amounts of solar energy can be collected and utilized in supplementing or satisfying power needs. One way of implementing solar energy collection technology is by assembling an array of multiple solar modules.

Solar modules can employ solar panels made of silicon or other materials (e.g., III-V cells such as GaAs) to convert sunlight into electricity. Solar panels typically include a plurality of photovoltaic (PV) cells interconnected with wiring to one or more appropriate electrical components (e.g., switches, inverters, junction boxes, etc.) to enable the solar array, and more specifically the solar panels to supply the power grid.

In some arrangements, solar modules are placed side-by-side in an array. Each solar module can be mounted to a rail system further mounted onto and perpendicular to a horizontal support structure or torque tube which is secured to a ground-based support structure, such as a pier.

Despite the incredible improvements in technology in terms of automatic positioning of the array such that the solar panels are optimally positioned to capture the sun's energy, improvements are always desired. This application is directed to improvements to the solar array design and construction

SUMMARY

One aspect of the disclosure is directed to a solar tracker including: at least one pair of piers configured to be secured in the ground and defining a span between the pair; a bearing supported on the pier; a torque tube supported in the bearing such that the bearing enables rotation of the torque tube, the torque tube including a double wall thickness area, where the double wall thickness area limits deflection of the torque tube along the span.

Implementations of this aspect of the disclosure may include one or more of the following features. The solar tracker where the double wall thickness area reduces the thickness of the torque tube outside of the double wall thickness area. The solar tracker where the double wall thickness area is centered on each pier. The solar tracker where the torque tube is formed of at least two sections. The solar tracker where the double wall thickness area is centered on a joint connecting the at least two sections. The solar tracker further including a sleeve inserted into the torque tube. The solar tracker where one of the sections includes a reduced diameter portion configured to be received within the second section to form the double wall thickness area. The solar tracker where the reduced diameter portion is swaged to reduce its diameter. The solar tracker further including a wall reinforcement formed of a pair of doubler plates fastened to opposing sides of the torque tube. The solar tracker where the wall reinforcement is centered on each pier. The solar tracker where the double wall thickness area increases the stiffness of the torque tube such that a greater span between the pair of piers is increased.

A further aspect of the disclosure is directed to a wall reinforcement including: a pair of doubler plates configured to receive a tube therebetween, at least one flange extending from each side of each of the doubler plates, at least one hole formed in each flange, a U-bolt configured to pass through a hole in each flange. The wall reinforcement also includes a backer plate configured to receive threaded ends of the U-bolt extending through holes in the flange on each side of the doubler plates; where the U-bolt and backer plate are configured to secure the doubler plates to the tube.

Implementations of this aspect of the disclosure may include one or more of the following features. The wall reinforcement where the pair of doubler plates stiffen a tube around which they are placed. The wall reinforcement where the pair of doubler plates are configured to be received in a bearing of a solar tracker. The wall reinforcement where the pair of doubler plates are placed on a top and a bottom surface of the tube. The wall reinforcement where the pair of doubler plates are placed on side surfaces of the tube.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

The present disclosure describes a system and method for locally increasing the rigidity of a torque tube of a solar tracker proximate a connection point to a pier to reduce deflections of the torque tube and enable decreased size of the torque tube.

Figure 1:
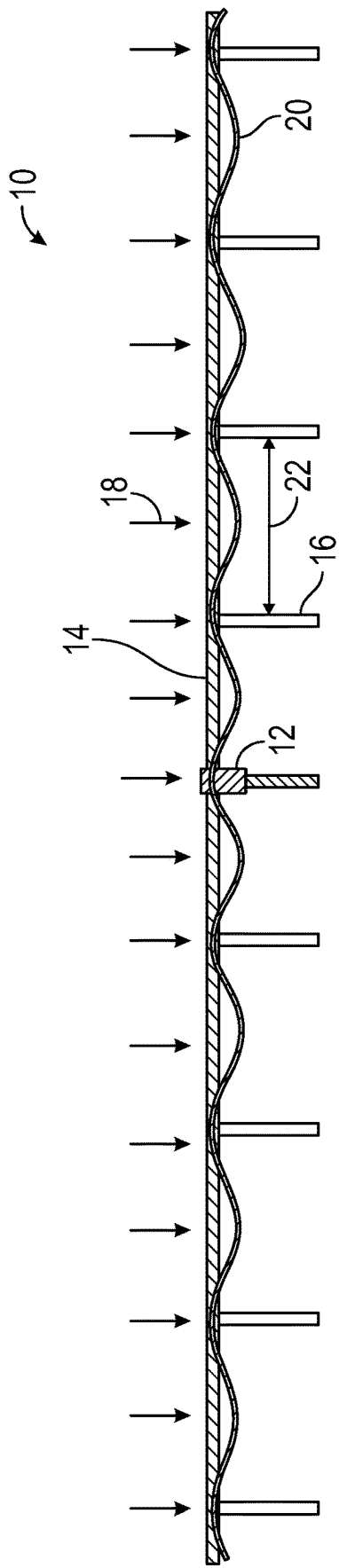
FIG. 1 is a side view of a solar tracker.

FIG. 1 depicts a side view of a solar tracker 10. The solar tracker 10 includes a drive system 12, which may be for example a slew gear drive driven by an electric motor, or other drive mechanism as is known in the art. Connected to the drive system 12 is a torque tube 14. The torque tube 14 typically consists of a round or square cross-section galvanized steel pipe. Of course, those of skill in the art will recognize that other materials may be employed if determined to be cost effective. The torque tube 14 is carried in a series of bearings (not shown in FIG. 1). The bearings and therewith the torque tube 14 are carried by a series of piers 16.

The loads 18 caused by the solar panels and rails (not shown) are borne by the torque tube 14. As can be observed by the flexure line 20, where the loads 18 correspond to the locations of the piers 16, the deflection of the torque tube 14 is minimized. In contrast, in span 22 between the piers 16 the deflection of the torque tube 14 is the greatest. Though the maximum deflection is experienced mid-span 22, the highest bending moment, which results in the deflection, is experienced at the piers 16. Thus, the piers represent high load areas of the torque tube 14.

In traditional solar tracker design, the entire torque tube 14 is simply increased in diameter and wall thickness upsized in order limit the deflection between the piers 16 to within a design tolerance. This results in more material added to the entire length of the tracker 10. The additional material results in added weight, to the entire tracker 10 requiring additional power to drive the solar tracker 10 as it follows the sun. Further, the additional material results in increasing costs for the solar tracker 10. This disclosure is directed a system and method of absorbing the bending moment where the capacity is only needed in about half to one-meter sections directly over piers.

Figure 2:
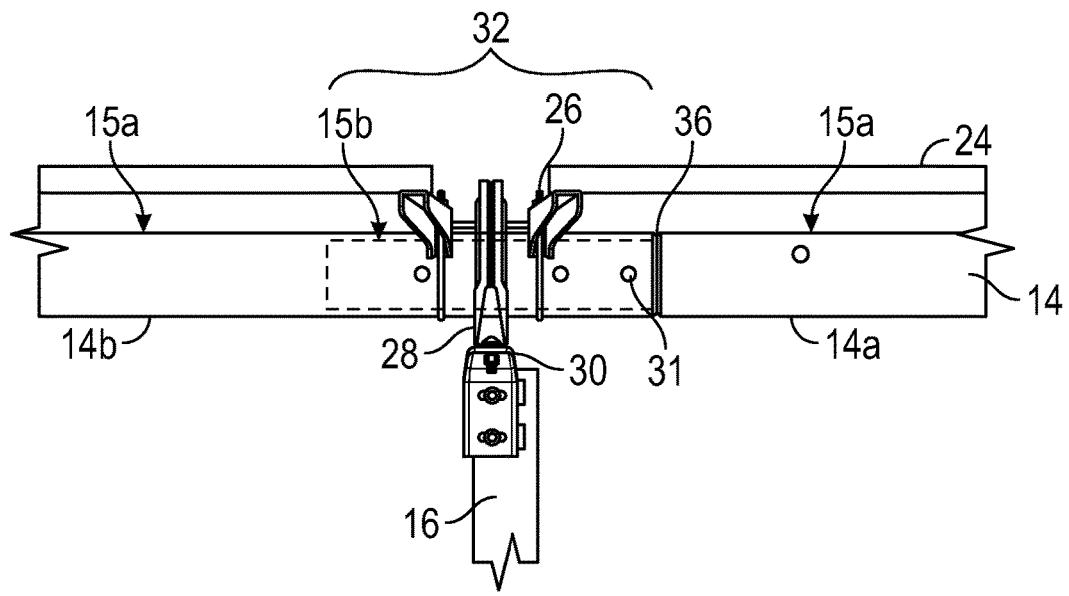
FIG. 2 is a side view of a pier and bearing supporting a torque tube in accordance with the disclosure.

FIG. 2 depicts one aspect of the disclosure. In FIG. 2 the solar modules 24 are connected on their ends to rails 26, which are secured to the torque tube 14. Between the rails 26 is a bearing 28. The torque tube 14 is received in the bearing 28, and the bearing 28 allows the torque tube 14 to rotate as the solar tracker 10 follows the sun. The bearing 28 connects to a support 30 which mechanically connects to the pier 18. As shown in FIG. 2 the torque tube 14 is formed of multiple sections. A first section 14a of the torque tube 14 includes a first diameter portion 15a and a second diameter portion 15b. The first diameter portion 15a is larger than the second diameter portion 15b. A second section 14b of the torque tube includes at least a portion 15a that corresponds in diameter with section 15a of the first section 14a and which is sized to receive the second diameter portion 15b of section 14a. As depicted in FIG. 2 the torque tube has a round cross-section, however, this same configuration can be achieved in torque tubes having square, rectangular, triangular, and other cross-sections without departing from the scope of the disclosure.

During the manufacturing process the second diameter portion 15b of the first section 14a of the torque tube 14 is swaged to achieve the reduced diameter of the second diameter portion 15b. This reduced diameter portion 15b of the first section 14a is received within the second section 14b of the torque tube 14. The first and second sections 14a and 14b are secured together with fasteners 31. The result is that in the portion of the torque tube 14, wherein the reduced diameter portion of the first section 14a is received within the second section 14b, the combined wall thickness of the torque tube 14 creates a doubled wall thickness area 32. As can be seen in FIG. 2, the area of doubled wall thickness 32 is centered on the pier 16 (e.g., at high load areas). In this way, the bending moment can be better borne at the locations where it is highest, proximate the piers 16. The swaged or reduced diameter portion 15b of first section 14a, and thus the double wall thickness area 32 may be, for example between one half and one meter in length, though longer lengths are also contemplated within the scope of the disclosure.

As a consequence of creating the doubled wall thickness area 32 of the torque tube 14 directly over the piers, the overall thickness of the material of the torque tube 14 can be reduced. Further, because the thickness of the torque tube 14 is typically associated with the diameter of the torque tube 14, the overall diameters may also be reduced. Further, because of the increased stiffness, longer sections 14a, 14b can be employed, which further or alternatively reduces the overall material usage and costs of the solar tracker 10.

Figure 3:
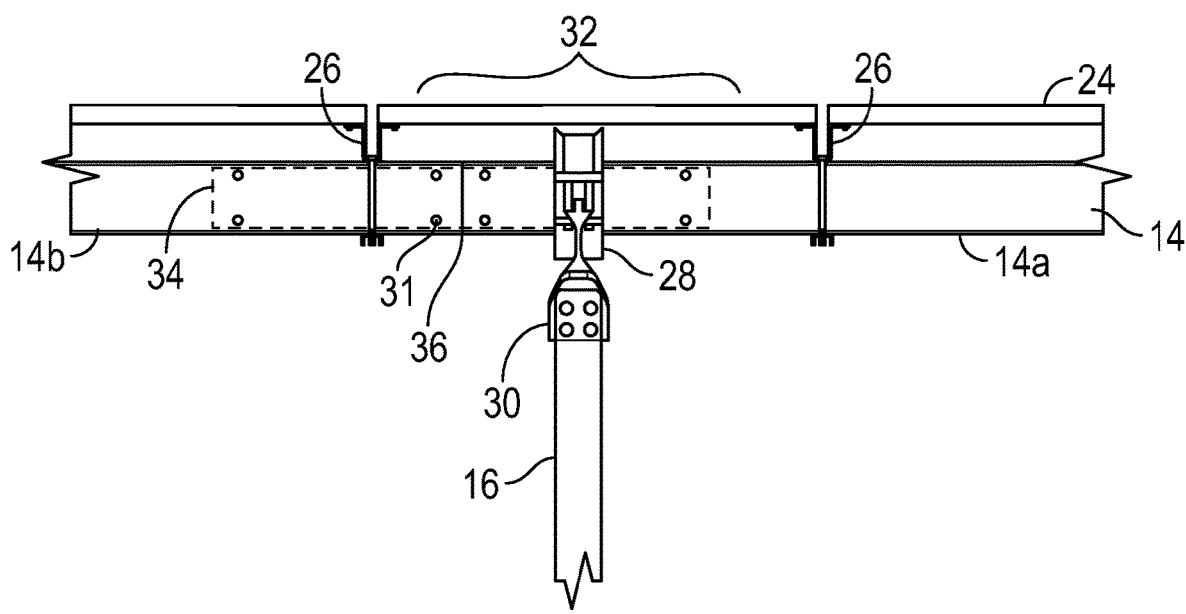
FIG. 3 is a side view of a pier and bearing supporting a torque tube in accordance with the disclosure.

An alternative arrangement, achieving similar results can be seen with respect to FIG. 3. In FIG. 3 the torque tube 14 has a uniform diameter along its entire length. Rather that swaging the first portion of the torque tube 14a to be received within the second portion 14b of the torque tube 14, a sleeve 34 is inserted into the torque tube 14. The sleeve 34 is centered on a joint location 36 between two adjacent portions of the torque tube 14. The connection point may be maintained some distance from the pier 16 to assist in easing construction. The sleeve 34 extends through the bearing 28 and creates a double walled area 32 centered on the pier 16. The double walled area 32 achieves a similar function as double walled area 32 in FIG. 2. The sleeve 34 acts as a tube splice effectively joining two sections 14a and 14b of the torque tube 14.

Figure 4:
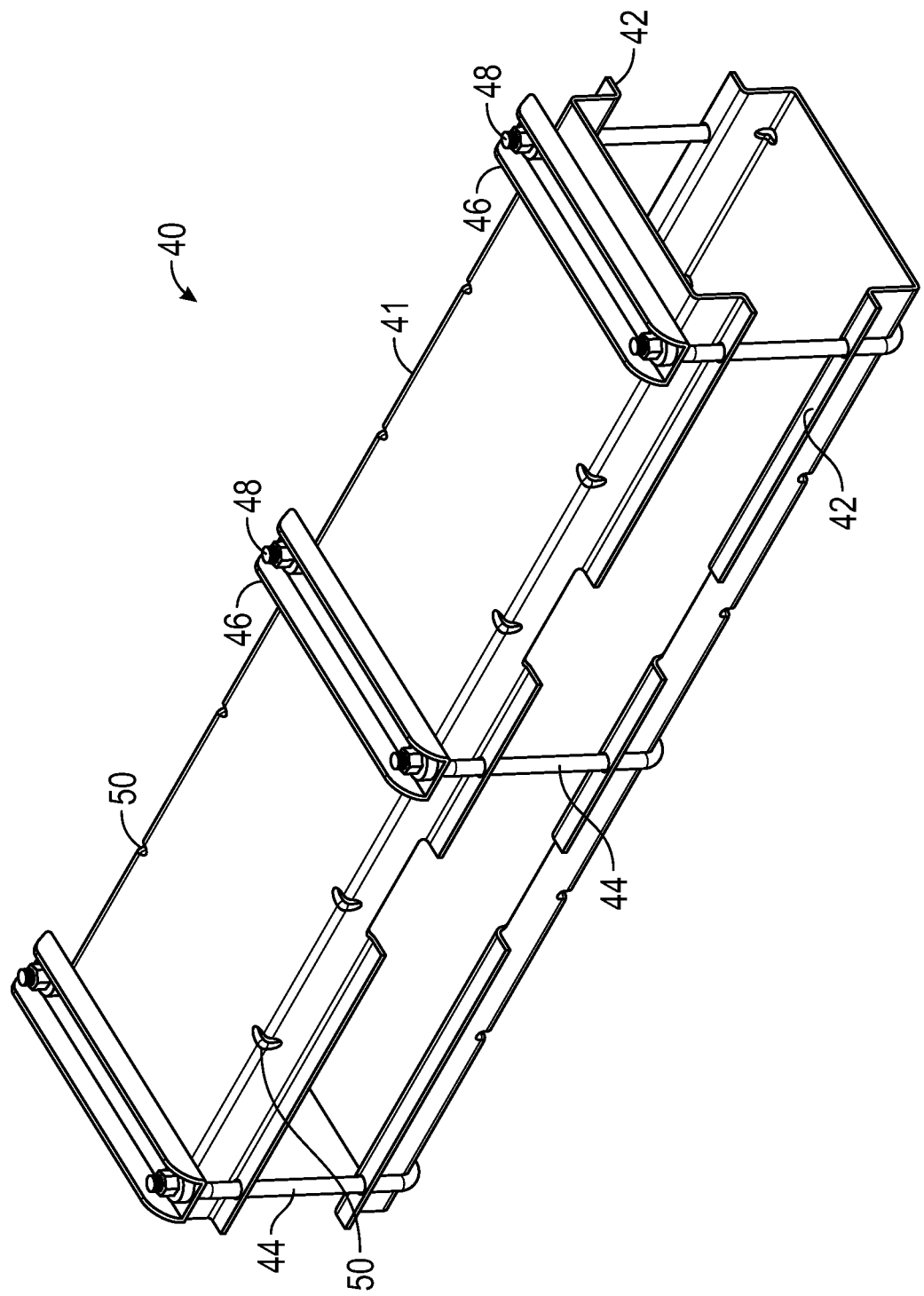
FIG. 4 is a perspective view of a wall reinforcement in accordance with the disclosure.

FIG. 4 depicts a further alternative solution in accordance with the disclosure. The solution in FIG. 4 is wall reinforcement 40 formed of two doubler plates 41. The doubler plates 41 may have a U-shaped configuration such that they mate with the torque tube 14 and the torque tube 14 is received within the U-shape. The doubler plates 41 include a plurality of flanges 42. The flanges 42 include holes formed therein to allow for the passage of fasteners 44. As shown in FIG. 4, the fasteners 44 are U-bolts. The open end of the U-bolts may be received in a strong back 46 and a nut 48 threaded on a threaded section of the U-bolt. Notches 50 can made with notches formed in a torque tube 14 to prevent axial movement of the wall reinforcement 40 relative thereto.

The wall reinforcement 40 further reduces the amount of material necessary to limit the bending moment. This reduction in material is achieved by only placing the doubler plates 41 on the bending axis of the torque tube 14. The fasteners 44 span the neutral axis of the torque tube 14, and thus no double plates are needed on that side of the torque tube 14.

Figure 5A:
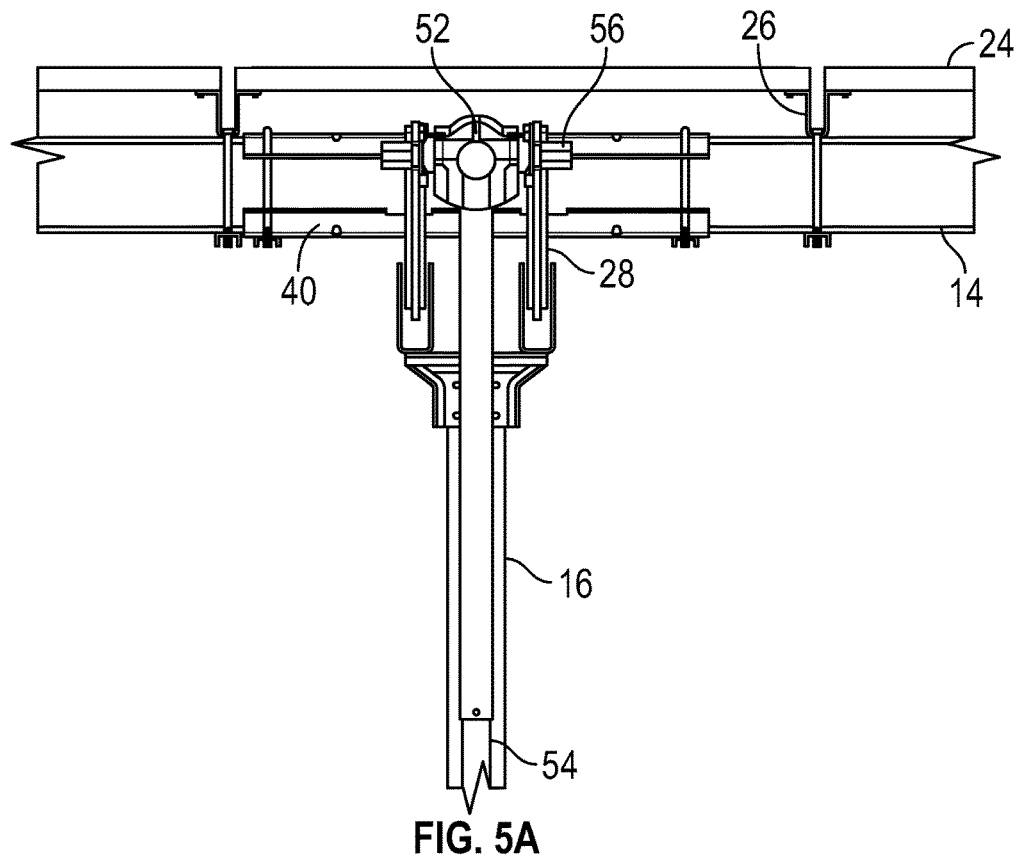
FIG. 5A is a side view of a wall reinforcement mounted in a bearing in accordance with the disclosure.
Figure 5B:
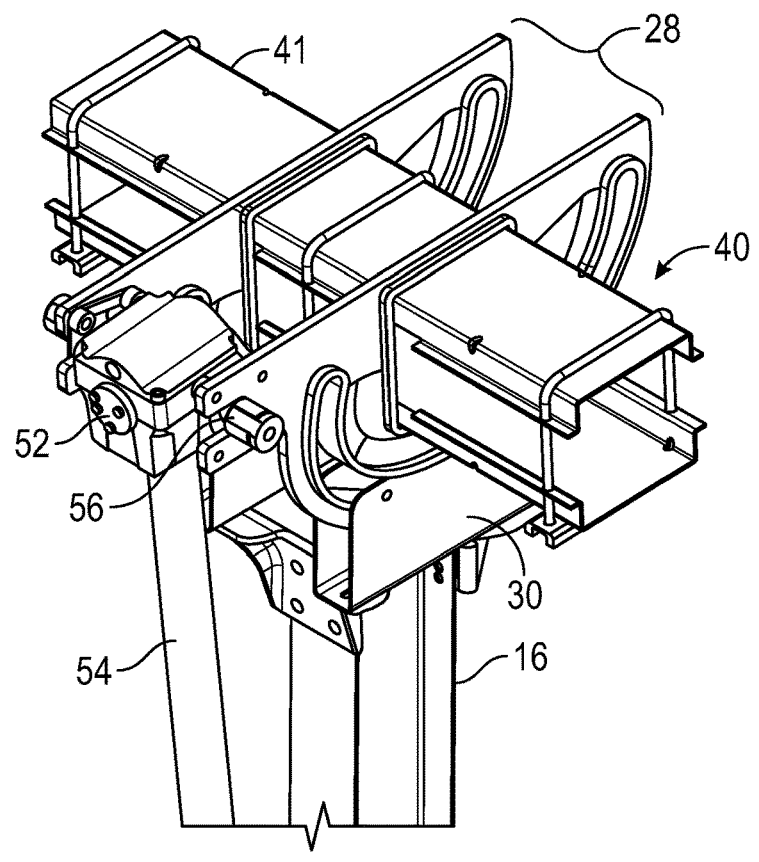
FIG. 5B is a perspective view of a wall reinforcement mounted in a bearing in accordance with the disclosure.
Figure 6A:
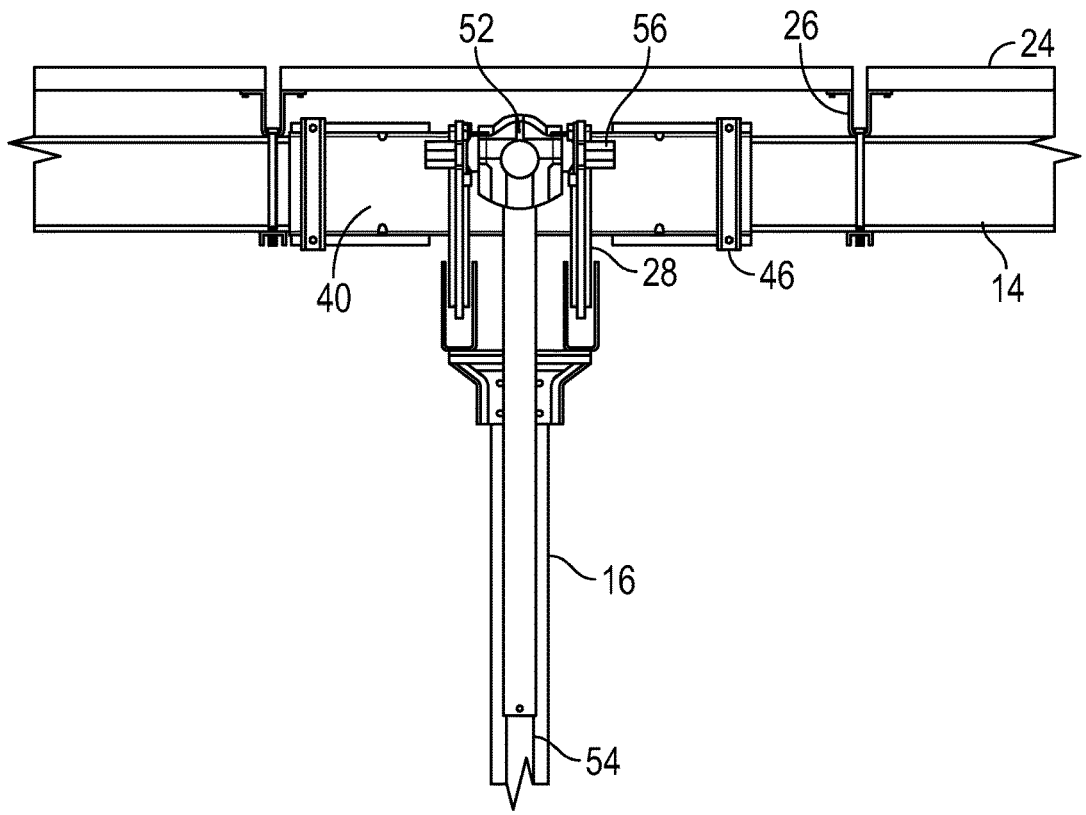
FIG. 6A is a side view of a wall reinforcement mounted in a bearing in accordance with the disclosure.
Figure 6B:
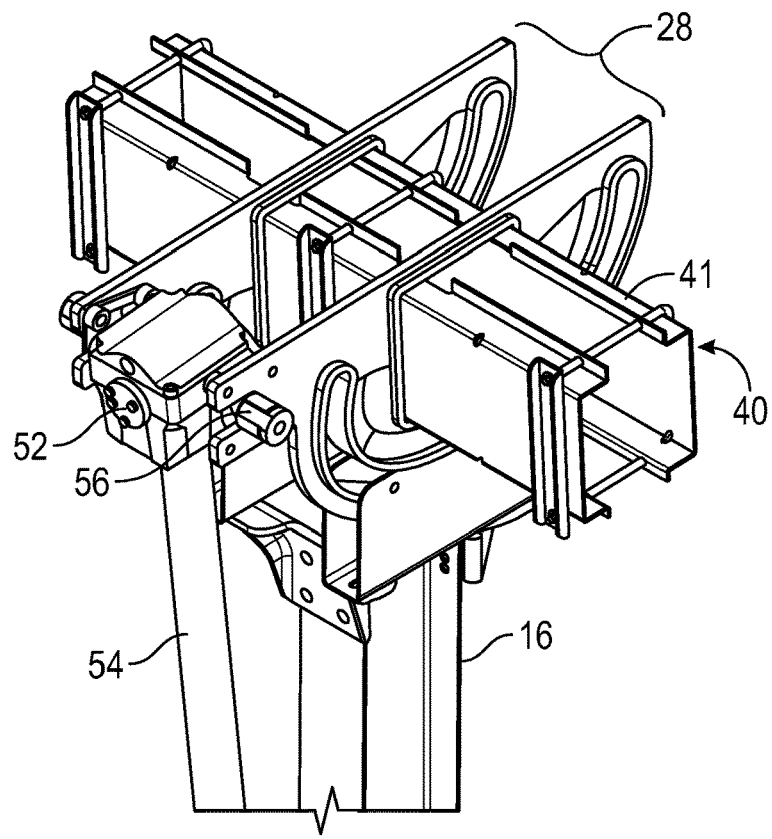
FIG. 6B is a perspective view of a wall reinforcement mounted in a bearing in accordance with the disclosure.

FIGS. 5A and 5B depict a particular implementation of wall reinforcement 40 in a balanced bearing 28. The balanced bearing 28 is modified to allow the torque tube 14 to be driven by a distributed drive system. The distributed drive system includes a gear box 52. The gear box 52 is operably connected on one end to a screw mechanism 54 which employs a threaded rod to extend and retract, thus rotating the torque tube 14. The gear box 52 receives a shaft 56 which extends between the piers 16 and allows a single motor (not shown) to drive all of the gear boxes 52 along the length of the solar tracker 10. In both FIGS. 5A and 5B, the wall reinforcement 40 is sized and shaped to receive within the bearing 28, and over the pier 16. Thus, the location of the wall reinforcement 40 is substantially similar to the double wall area 32 of FIGS. 2 and 3. In FIGS. 5A and 5B, the wall reinforcement 40 is located on a top and bottom portion of the torque tube when the solar tracker 10 is in the 0° position or substantially perpendicular to the piers 16. Alternatively, the wall reinforcement 40 may be located such that the doubler plates 41 are placed on the sides of the torque tube 14 when the solar tracker is in the 0° position or substantially perpendicular to the piers 16.

The thickness of the doubler plates 41 may be thickened as necessary for a given application. Similarly, the length of the doubler plates 41 may be increased or reduced as necessary to effectively reduce the effects of the bending moment such that torque tube 14 remains substantially straight and without damaging deflections to the torque tube 14.

Additionally, the wall reinforcement may be placed at any location a pier 16 is needed, and need not be located at or proximate a joint location 36, as depicted in FIGS. 2 and 3. Nonetheless, the wall reinforcement 40 can be employed to reduce the thickness of the torque tube 14 and to provide the additional thickness and stiffness for the torque tube at the location of the highest bending moment (i.e., over the piers 16) the thickness and in some instances diameter of the torque tube 14 may be reduced. Further, by increasing the stiffness at the piers 16, to total number of piers 16 in a solar tracker 10 may be reduced.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. A solar tracker, comprising:
    at least one pair of piers configured to be secured in the ground and defining a span between respective piers of the at least one pair of piers;
    a bearing supported on a pier of the at least one pair of piers;
    a torque tube rotatably supported in the bearing, the torque tube including a double wall thickness area, the double wall thickness area including a sleeve inserted into the torque tube, wherein the double wall thickness area limits deflection of the torque tube along the span; and
    a drive system operably coupled to the torque tube, wherein the drive system effectuates rotation of the torque tube within the bearing as the solar tracker follows an orientation of the sun.

2. The solar tracker of claim 1, wherein the torque tube has a single wall thickness outside of the double wall thickness area.

3. The solar tracker of claim 1, wherein the double wall thickness area is centered on each pier.

4. The solar tracker of claim 1, wherein the torque tube is formed of at least two sections.

5. The solar tracker of claim 4, wherein the double wall thickness area is centered on a joint connecting the at least two sections of the torque tube.

6. The solar tracker of claim 4, wherein one of the at least two sections includes a reduced diameter portion configured to be received within the second section to form the double wall thickness area of the torque tube.

7. The solar tracker of claim 6, wherein the reduced diameter portion is swaged to reduce the diameter of the torque tube at the reduced diameter portion.

8. The solar tracker of claim 1, wherein the double wall thickness area is formed at high load areas of the torque tube.

* * * * *